US012614774B2

(12) United States Patent
Schurz et al.

(10) Patent No.: US 12,614,774 B2
(45) Date of Patent: Apr. 28, 2026

(54) BATTERY ARRANGEMENT FOR A MOTOR VEHICLE

(71) Applicant: Mercedes-Benz Group AG, Stuttgart (DE)

(72) Inventors: Andreas Schurz, Aichelberg (DE); Andreas Ruoff, Neuhausen (DE); Stefan Riedlinger, Kirchheim (DE); Reiner Jost, Calw (DE); Christian Stasch, Herrenberg (DE); Marius Gaeckle, Althengstett (DE)

(73) Assignee: Mercedes-Benz Group AG, Stuttgart (DE)

( * ) Notice: Subject to any disclaimer, the term of this patent is extended or adjusted under 35 U.S.C. 154(b) by 383 days.

(21) Appl. No.: 18/261,764

(22) PCT Filed: Apr. 26, 2022

(86) PCT No.: PCT/EP2022/061113
§ 371 (c)(1),
(2) Date: Jul. 17, 2023

(87) PCT Pub. No.: WO2022/253493
PCT Pub. Date: Dec. 8, 2022

(65) Prior Publication Data
US 2024/0079668 A1 Mar. 7, 2024

(30) Foreign Application Priority Data
May 31, 2021 (DE) ..................... 10 2021 002 803.1

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 50/204* (2021.01); *H01M 50/249* (2021.01); *H01M 2220/20* (2013.01)

(58) Field of Classification Search
CPC ............. H01M 10/613; H01M 10/625; H01M 50/249; H01M 50/204; H01M 50/242; H01M 50/244; H01M 2220/20
See application file for complete search history.

(56) References Cited

U.S. PATENT DOCUMENTS

2019/0326565 A1 10/2019 Zhou et al.
2022/0069377 A1* 3/2022 Rhee ................... H01M 10/658
(Continued)

FOREIGN PATENT DOCUMENTS

CN 211320182 U 8/2020
CN 112151910 A 12/2020
(Continued)

OTHER PUBLICATIONS

PCT/EP2022/061113, International Search Report dated Oct. 14, 2022 (Two (2) pages).
(Continued)

*Primary Examiner* — Christopher P Domone
(74) *Attorney, Agent, or Firm* — Crowell & Moring LLP

(57) ABSTRACT
A battery arrangement for a motor vehicle includes a battery housing and a cell module that is disposed on a base plate of the battery housing. The cell module has a cell module housing and a plurality of battery cells disposed in the cell module housing and a base of the cell module housing is connected to the base plate of the battery housing by an adhesive compound. The cell module housing is connected to a side wall of the battery housing by an adhesive and the adhesive has a higher shearing resistance than the adhesive
(Continued)

compound disposed between a base of the cell module housing and the base plate of the battery housing.

9 Claims, 3 Drawing Sheets

(51) Int. Cl.
   H01M 50/204        (2021.01)
   H01M 50/249        (2021.01)

(56)                       References Cited

U.S. PATENT DOCUMENTS

2022/0166084 A1*   5/2022  Park ................... H01M 10/647
2023/0163436 A1*   5/2023  Akasawa ........... H01M 50/202

FOREIGN PATENT DOCUMENTS

EP         3 736 879 A1    11/2020
KR        20200033774 A      3/2020

OTHER PUBLICATIONS

Erica Lawrence, "ISO 527-2: Tensile Testing for Plastics", Instron, URL: https://www.instron.com/en-us/testing-solutions/iso-standards/iso-527-2?region=NorthAmerica&lang=en-US (Twenty (20) pages).

* cited by examiner

BATTERY ARRANGEMENT FOR A MOTOR VEHICLE

BACKGROUND AND SUMMARY OF THE INVENTION

The invention relates to a battery arrangement for a motor vehicle, having a battery housing and at least one cell module that is arranged on a base plate of the battery housing. The at least one cell module comprises a cell module housing and a plurality of battery cells arranged in the cell module housing. A base of the cell module housing is connected to the base plate of the battery housing by means of an adhesive compound.

CN 112151910 A describes a fluid-cooled battery system for a vehicle in which battery modules are arranged in a housing. The housing comprises a frame surrounding the battery module and a cooling plate that is connected to the frame. The battery modules are arranged on the cooling plate within the frame. On the one hand, the battery modules are adhered to the cooling plate by means of a heat-conducting structural adhesive. On the other hand, the frame is also connected to a top side of the cooling plate by means of the structural adhesive, wherein a welded connection is additionally provided in corner regions of the frame.

It can further be provided for a battery arrangement for a motor vehicle that the cell modules are screwed to the battery housing. A heat-conducting paste can here be arranged between the base of the cell module housing and the base plate of the battery housing. The cell modules can be connected to the battery housing by installing the screws in a screw attachment bar arranged laterally next to the respective cell module housing. In this embodiment, however, a corresponding clearance is provided laterally next to the cell modules to obtain access to the screws with a screwdriver. This is not favorable.

Such a connection of the cell modules to the battery housing only occurring laterally is further not ideal, in particular if the cell modules have a comparatively high weight, as can be the case for cell modules for a battery arrangement of a motor vehicle.

Additionally, in such an arrangement of the cell modules, in which the cell modules are screwed to the screw attachment bar of the battery housing, only a comparatively ineffective side profile is provided with regard to a lateral impression of the battery housing by the respective cell module. This accompanies a comparatively low resistance moment of the battery arrangement. Correspondingly, a mechanical stiffness of the respective cell module is not optimally used for the overall mechanical performance of the battery arrangement when the cell modules are screwed to the battery housing.

Arranging the comparatively expensive heat-conduction paste between the base of the cell module housing and the base plate of the battery housing is additionally connected to comparatively high costs. A large quantity of heat-conduction paste here additionally contributes in a disadvantageous manner to a correspondingly high weight of the battery arrangement.

When a gap or clearance is arranged between the base of the cell module housing and the base plate of the battery housing, tolerances should additionally be taken into account. This results in a comparatively large gap or large clearance between the base of the cell module housing and the base plate of the battery housing. Correspondingly, a comparatively large amount of expensive heat-conduction paste must be used to fill this clearance or gap as completely as possible. As previously explained, this is disadvantageous with regard to the costs and the weight of the battery arrangement.

The object of the present invention is to create a battery arrangement of the type specified in the introduction, in which an improved mechanical connection of the at least one cell module to the battery housing is obtained.

The battery arrangement according to the invention for a motor vehicle comprises a battery housing and at least one cell module. The at least one cell module is arranged on a base plate of the battery housing. The at least one cell module comprises a cell module housing and a plurality of battery cells arranged in the cell module housing. A base of the cell module housing is connected to the base plate of the battery housing by means of an adhesive compound. The cell module housing is further connected to a side wall of the battery housing by means of a further adhesive. The further adhesive here has a higher shearing resistance than the adhesive compound arranged between the base of the cell module housing and the base plate of the battery housing.

The mechanical connection of the at least one cell module to the battery housing is correspondingly ensured by the further adhesive arranged between the side wall of the battery housing and the cell module housing. The further adhesive having the comparatively high shearing resistance specifically carries a main load with regard to mechanical requirements. An improved mechanical connection of the at least one cell module to the battery housing is consequently achieved in the battery arrangement.

In contrast, the lower shearing resistance of the adhesive compound ensures that at least one cell module housing can still be very easily separated from the battery housing in the case of a required demounting. For this purpose, the further adhesive must first be cut through. Due to the good accessibility of this further adhesive, this can be very easily undertaken, however, for example by means of a cutting tool moving back and forth, for example in the form of an oscillating blade.

Following such cutting through of an adhesive layer formed by the further adhesive, the at least one cell module can then be very easily lifted out of the battery housing, for example by means of a lifting tool. This lifting of the at least one cell module from the battery housing is particularly simple, as the adhesive compound only has the comparatively low shearing resistance.

As it is not required to screw the at least one cell module to the battery housing, and in particular to the side wall of the battery housing, it is in particular possible to save costs and save space. This is due to the effective mechanical connection of the cell modules in the overall battery structure, in particular due to the use of the further adhesive having the high shearing resistance.

In this way, it is further possible to keep a gap or clearance between the base of the at least one cell module housing and the base plate of the battery housing particularly small. This applies in particular in comparison with a battery arrangement in which the at least one cell module is screwed to the battery housing. Due to the direct alignment of the at least one cell module on the base plate of the battery housing with the interposition of the adhesive compound, a reduction of the tolerance chain can be achieved. Costs for the adhesive compound and also a quantity of adhesive compound can thus be spared. This contributes to saving weight of the battery arrangement.

If the battery arrangement is used in a motor vehicle, wherein a high-voltage battery is preferably provided via the at least one cell module of the battery arrangement, then such weight saving is particularly advantageous with regard to a $CO_2$ balance of the motor vehicle.

Due to the low gap tolerance between the base of the cell module housing and the base plate of the battery housing, a particularly effective cooling of the battery cells received in the cell module housing can additionally be obtained in the operation of the same. In particular, a fast charging ability of the battery cells can thus be improved.

In an advantageous manner, the gap tolerance in the battery arrangement results only from surface shape tolerances of an adhesive surface provided by the base plate of the battery housing and an adhesive surface provided by the base of the at least one cell module housing. As a result, the battery arrangement can be manufactured from a comparatively low quantity of adhesive compound.

The connection of the at least one cell module to the battery housing is further improved with regard to the installation space, as no clearance needs to be provided for accessibility to the screws with a screwdriver. This is because it is not required to screw the at least one cell module to the battery housing due to the use of the further adhesive for connecting the cell module housing to the battery housing.

It is additionally possible to provide an effective contribution to the mechanical performance of the entire battery or the battery arrangement via the cell module housing. Force paths can additionally be formed and effectively used within the battery arrangement via simple solutions. Nevertheless, the at least one cell module can thus be removed just as easily as is the case for a connection of the at least one cell module to the battery housing by means of screws or bolts.

The shearing resistance of the adhesive compound preferably lies in the range from approximately 0.1 MPa to approximately 2 MPa. It has further proved advantageous if the shearing resistance of the further adhesive lies in the range from approximately 5 MPa to approximately 15 MPa. It can thus in particular be achieved that even if a comparatively small adhesive surface is provided, on which the cell module housing is connected to the side wall of the battery housing by means of the further adhesive, a large holding force is created. On the other hand, the comparatively low shearing resistance or low tensile strength of the adhesive compound ensures, in comparison, that a non-destructive removal of the cell modules is guaranteed by pulling away the cell modules upwards in the case of repair or for recycling.

Further advantages, features and details of the invention result from the following description of preferred exemplary embodiments and with reference to the drawings. The features and combinations of features previously specified in the description and the features and combinations of features specified below in the description of the figures and/or shown in the figures alone can be used not only in the respectively specified combination, but also in other combinations or in isolation without leaving the scope of the invention.

4

Figure 3:
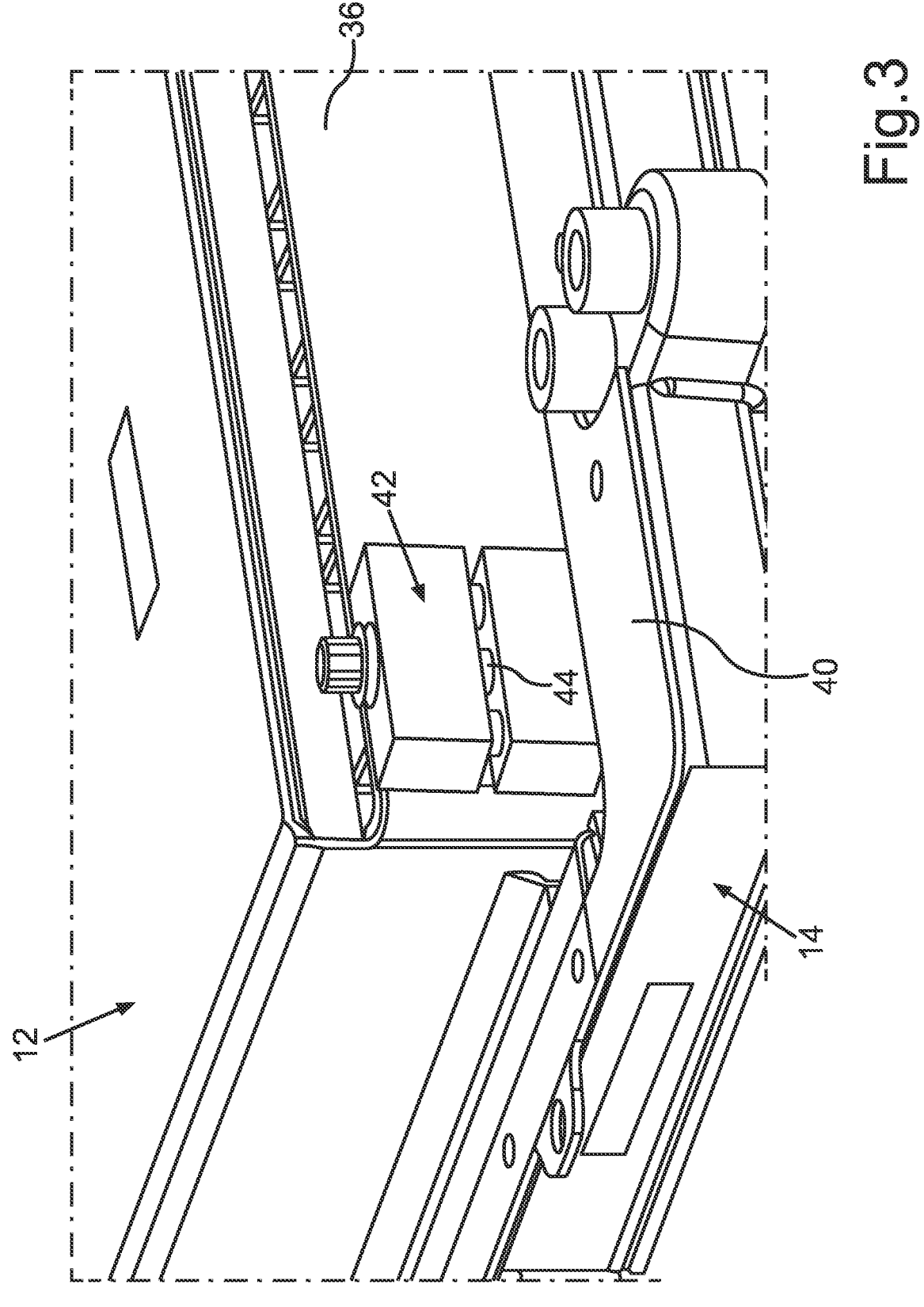

FIG. 3 schematically shows a further portion of the battery arrangement and a lifting tool for lifting the cell module out of the battery housing.

DETAILED DESCRIPTION OF THE DRAWINGS

Identical or functionally identical elements are respectively provided with the same reference numerals in the figures.

Figure 1:
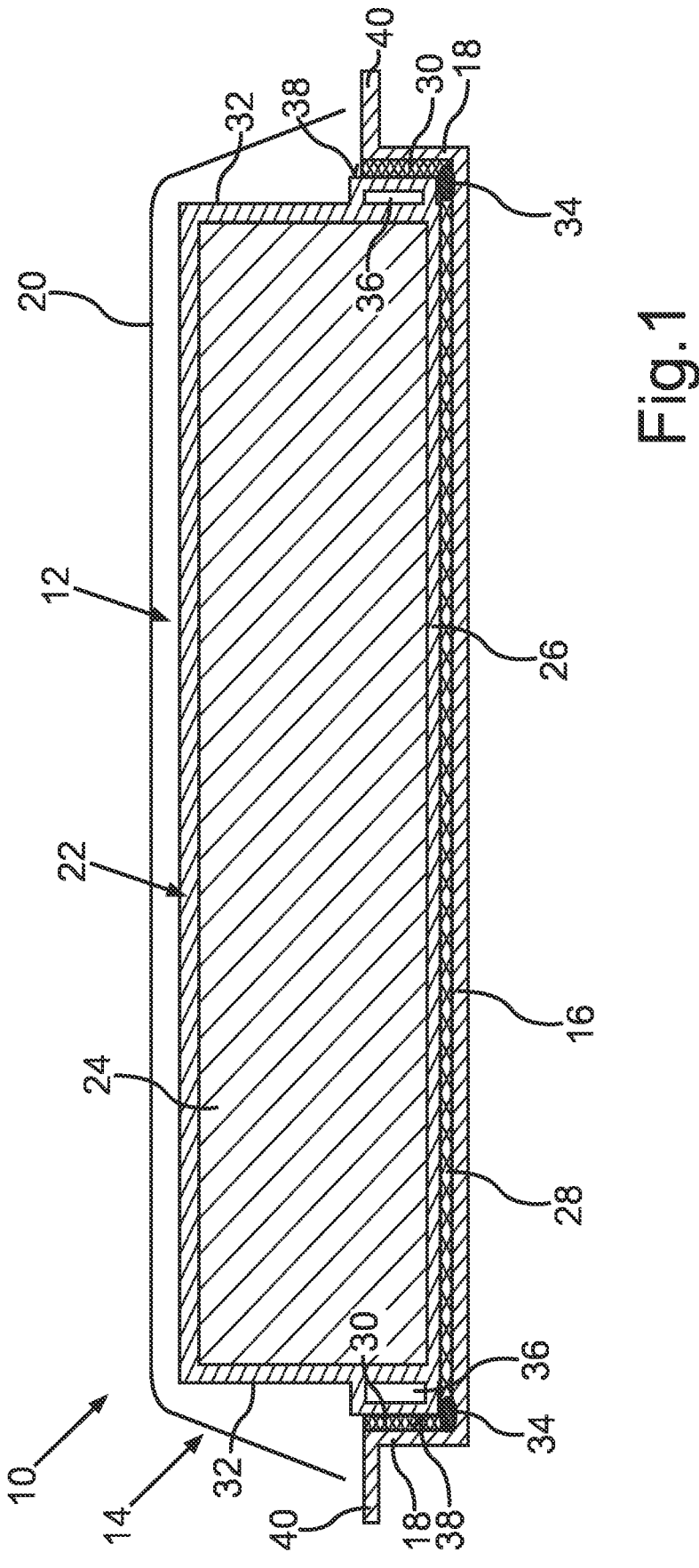
FIG. 1 highly schematically shows a battery arrangement, in which a cell module is adhered to a battery housing of the battery arrangement by means of two adhesives that have different shearing resistances.

In FIG. 1, a battery arrangement 10 is highly schematically shown, in which a cell module 12 is arranged in a battery housing 14. The battery housing 14 comprises a presently trough-shaped receiving part having a base plate 16 and a side wall 18 surrounding the base plate 16. As is presently shown in exemplary form, the side wall 18 can in particular be designed as one part with the base plate 16 of the battery housing 14. The battery housing 14 further comprises a housing cover 20 that is connected to the trough-shaped receiving part in a manner not presently shown in more detail. The at least one cell module 12 is arranged within a receiving chamber delimited by the trough-shaped receiving part and the housing cover 20.

The at least one cell module 12 presently has a cell module housing 22 and battery cells 24 arranged within the cell module housing 22, said battery cells not presently being shown in detail. The individual battery cells 24 of the cell module 12 are essentially electrically conductively connected to one another, wherein the battery cells 24 of the respective cell module 12 can be electrically switched in series and/or in parallel.

In particular if a high-voltage battery should be provided for a motor vehicle by the battery arrangement 10, and thus an electrical energy storage device preferably designed as a traction battery of the motor vehicle, which has a nominal power of more than 60 volts, and in particular of up to several hundred volts, several cell modules 12 can be electrically conductively connected to one another in the battery housing 14.

The cell module housing 22 comprises a base 26 facing the base plate 16 of the battery housing 14. An adhesive compound 28 is arranged between the base 26 and the base plate 16. This adhesive compound 28 is preferably designed to be able to conduct heat, such that released heat can be effectively emitted via the adhesive compound 28 from the battery cells 24 in the operation of the same to the battery housing 14 or a corresponding cooling device. For example, the heat conductivity of the adhesive compound 28 can be approximately 2 W/mK, and in particular lie in the region of 2 W/mK to 2.5 W/mK.

The adhesive compound 28 ensures a certain fixing of the cell module 12 within the battery housing 14. However, a shearing resistance or holding force of the adhesive compound 28 is preferably dimensioned such that the cell module 12 can be easily separated from the battery housing 14, in particular from the base plate 16, again in the case of a repair or exchange of the at least one cell module 12. The adhesive compound 28 preferably has a minimum adherence by which crash requirements and operating strength requirements can be fulfilled. The non-destructive removal of the cell modules 12 from the battery housing 14, and in particular a removal from the trough-shaped receiving part of the battery housing 14, is still guaranteed by the comparatively low shearing resistance or tensile strength of the adhesive compound 28.

Unlike the adhesive compound 28 serving as a heat-conducting adhesive, a further adhesive 30 ensures the structural connection of the at least one cell module 12 to the battery housing 14. The cell module housing 22 is presently connected to the side wall 18 of the battery housing 14 by means of this further adhesive 30, which is schematically depicted in FIG. 1. This further adhesive 30 has a very high shearing resistance, which can for example lie in the range of in particular 8 MPa to 14 MPa. Contrastingly, the shearing resistance or tensile strength of the adhesive compound 28 can in particular lie in the range of approximately 0.5 MPa to 1.5 MPa.

Both the shearing resistance or tensile strength of the further adhesive 30 serving as a fixing adhesive and the shearing resistance or tensile strength of the adhesive compound 28 serving as a heat-conducting adhesive can in particular be determined according to DIN EN ISO 527-2.

For the stable fixing of the at least one cell module 12 in the battery housing 14, the further adhesive 30 is arranged laterally to the cell module 12 and in particular between a side wall 32 of the cell module housing 22 and the side wall 18 of the trough-shaped receiving part of the battery housing 14. The further adhesive 30 having the high shearing resistance can be cut through, for example by means of an oscillating knife, to demount the cell module 12. This is particularly easy, as a good accessibility for a cutting tool of this kind is provided on the sides of the cell module housing 22.

The adhesive compound 28 preferably substantially areally covers the base 26 of the cell module housing 22. A delimiting element can be provided for delimiting a corresponding adhesive surface so that the adhesive compound 28 is well levelled and a clearance or gap between the base plate 16 of the battery housing 14 and the base 26 of the cell module housing 22 is filled with the adhesive compound 28 as evenly as possible.

The delimiting element, for example designed as a sealing cord or sealing tape 34, thus delimits the edges of the surface occupied by the adhesive compound 28 on the base plate 16 of the battery housing 14. The sealing tape 34 or equivalent delimiting element can here be applied onto the cell module 12 and/or onto the base plate 16 before the installation of the at least one cell module 12 in the battery housing 14.

Foam materials are in particular suitable for providing a delimiting element of this kind. If an electrically conductive connection of the cell module 12 to the base plate 16 should be provided, then such a foam material can also be metallically laminated. The foam material can correspondingly be surrounded by an electrically conductive metal of the delimiting element.

It can further be seen from FIG. 1 that the cell module 12 can have an energy absorption element 36, via which an impact geometry is provided. Such an energy absorption element 36 can absorb impact energy via deformation in the case of a lateral application of force to the battery arrangement 10, and so avoid damage, in particular of the battery cells 24. In the embodiment schematically shown in FIG. 1, the further adhesive 30 is arranged between an outside 38 of the energy absorption element 36 and the side wall 18 of the trough-shaped receiving part of the battery housing 14.

Figure 2:
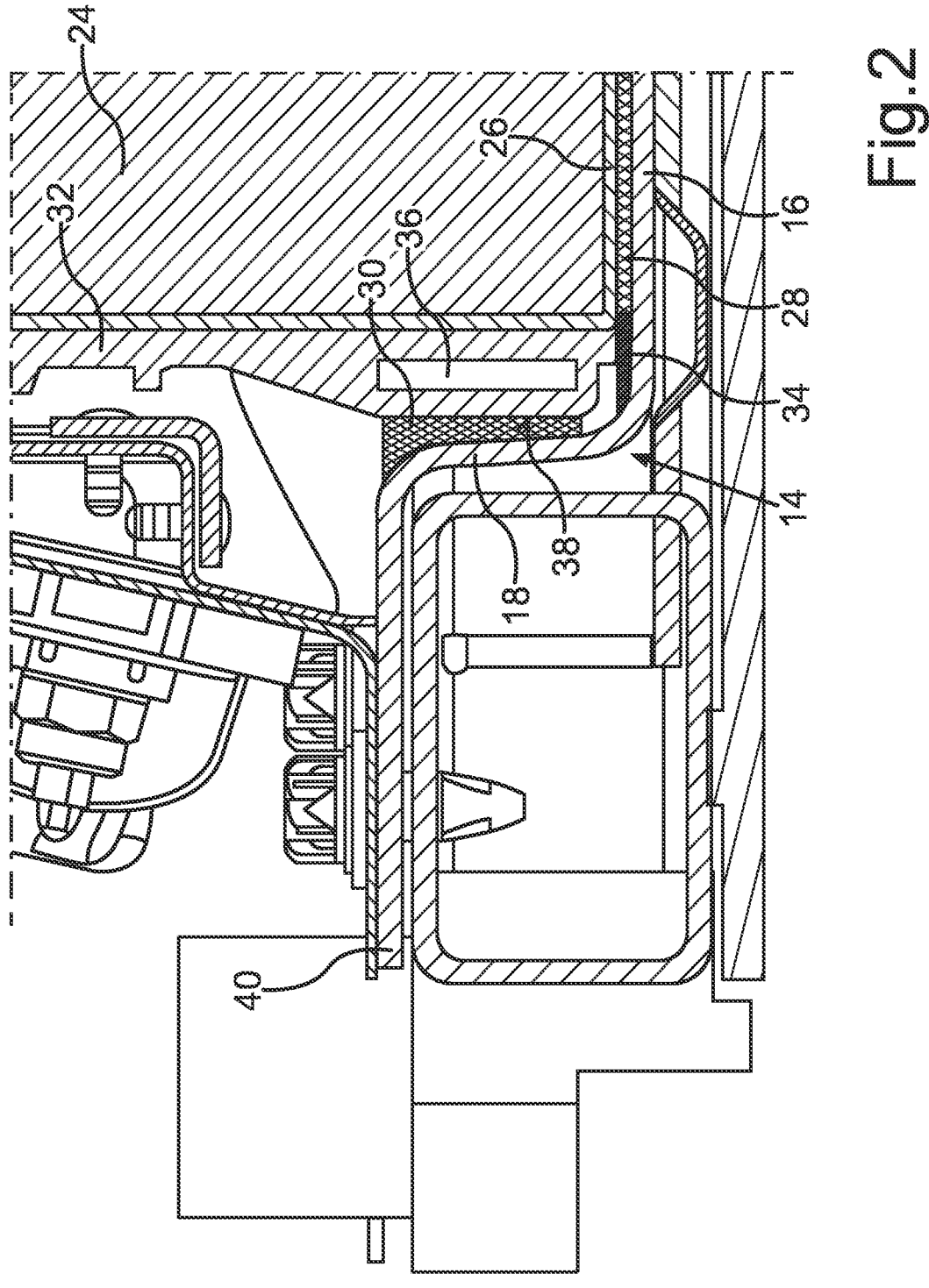
FIG. 2 schematically shows a portion of the battery arrangement according to FIG. 1.

A possible embodiment of the energy absorption element 36 in particular designed as one part with the side wall 32 in the manner of a chamber having a cavity is shown in exemplary form in FIG. 2.

Correspondingly, a possible embodiment of a peripheral flange 40 can be seen from FIG. 3, which can belong to the trough-shaped receiving part of the battery housing 14. The housing cover 20 of the battery housing 14 (see FIG. 1) can in particular be fixed to such a peripheral flange 40.

In FIG. 3, a lifting device 42 is additionally schematically shown, which can be used for the purpose of removing the cell module 12 from the battery housing 14 after cutting through the adhesive 30. The separation of the base 26 of the cell module housing 22 from the base plate 16 (see FIG. 1) of the battery housing 14 can thus be obtained by operating the lifting device 42. The lifting device 42 can be operated after the further adhesive 30 has been cut through, which serves for the structural connection of the cell module 12 to the battery housing 14, and can thus be described as a fixing adhesive.

The lifting device 42 can comprise a threaded spindle 44, for example, wherein the lifting of the base 26 of the cell module housing 22, and thus of the entire cell module 12, away from the base plate 16 of the battery housing 14 (see FIG. 1) can be achieved by turning the threaded spindle 44. It is particularly easy to lift the cell module 12 out of the trough-shaped receiving part of the battery housing 14 when such a lifting device 42 is provided.

By providing the adhesives having different shearing resistances in the form of the preferably heat-conducting adhesive compound 28 on the one hand and the further adhesive 30 serving as a fixing adhesive on the other, two joining concepts coordinated with each other are presently provided. The coordinating joining concepts ensure the provision of a sufficient holding force for fixing the cell block or cell module 12 within the battery housing 14 for requirements in the normal operation of the battery arrangement 10 on the one hand, but also for requirements in the case of exceptional events, for example if an accident of the motor vehicle equipped with the battery arrangement 10 occurs.

The possibility of a non-destructive removal of the at least one cell module 12 and continued usage of the individual components in the case of a repair is further provided without extensive cleaning of surfaces being required. A sufficient heat removal from the batteries 24 of the cell modules 12 to the battery housing 14, and in particular an integrated cooling device, is additionally guaranteed.

Possible parameters of the joining concept provided by the heat-conducting adhesive or the adhesive compound 28 shall be explained in the following in exemplary form. An adhesive able to be obtained from Sika Deutschland GmbH can thus be used as the adhesive compound 28, which can be obtained under the brand name Sikaflex®-953 L30. This is a two-component adhesive having a silane-terminated polymer. This adhesive has a tensile strength from 0.5 MPa to 1.5 MPa, and a viscosity of 30+/−20 Pa s. The heat conductivity of this adhesive or this adhesive compound 28 lies in the range of 2 W/mK to 2.5 W/mK. When using this material, the elongation at break of the adhesive compound 28 further lies between approximately 20 percent and 50 percent according to DIN EN ISO 527-2.

This adhesive compound 28 can be extensively applied on the substantially horizontal surface between the base plate 16 of the battery housing 14 and the base 26 of the at least one cell module 12. The surface of the base plate 16, for example, on which the adhesive compound 28 is applied does not need to be strictly horizontal, however. Deviations of +10° to −10° from the horizontal can in particular be present.

A joint or gap between the base plate 16 and the base 26 is preferably as small as possible in order to guarantee an effective heat removal. A size of the gap can in particular lie in the range from 0.5 millimetres to 3 millimetres.

At the location of this joint, the adhesive compound 28 is arranged as extensively as possible between the base plate 16 of the battery housing 14 and the base 26 of the respective cell module housing 22, such that, on the one hand, an even heat transportation and, on the other, an even fixing of the cell modules 12 can be obtained.

Contrastingly, a two-component adhesive in the form of a polyurethane adhesive can be used for the structural connection by means of the further adhesive 30, for example an adhesive able to be obtained from DuPont under the name BETAFORCE™ 9050, which can correspondingly have the identification BF9050. This adhesive has a viscosity of less than 1 Pa s and a heat conductivity of less than 0.3 W/mK.

The elongation at break for this adhesive further lies in the range of 150 percent to 250 percent according to DIN EN ISO 527-2. This adhesive additionally has a Shore hardness of approximately less than 100 Shore A and a temperature resistance up to approximately 800 degrees Celsius.

The further adhesive 30 is preferably applied between the two longitudinal sides of the cell block or cell module 12 and the battery housing 14, and in particular the side wall 18, on a substantially vertical surface. The surface does not need to be strictly vertical, however, and in particular deviations from the verticals of +10° to −10° can exist.

The joint in which the further adhesive 30 is installed preferably has a thickness of at least 1.5 millimetres, taking into account all relevant tolerances. In the case of a repair it is thus possible to introduce a cutting tool, for example an oscillating tool, into this region in order to release the adhesive connection.

The further adhesive 30 preferably fulfils a strength requirement such that its shearing resistance is at least 8 MPa. In this way, a very high holding force can be applied to a comparatively small surface by the further adhesive 30.

In particular in relation to the surface of the base 26 of the cell module housing 22 covered by the adhesive compound 28, the surface on the side wall 32 of the cell module housing 22 covered by the adhesive 30 is very small, and preferably smaller by a multiple. On the one hand, providing a correspondingly small surface occupied by the further adhesive 30 is advantageous, so that it is possible to cut through the adhesive 30 and then to release the cell modules 12 with a cutting tool of a comparatively short length and low cutting force or within a short process duration.

Large surfaces are further still available in the region of the side walls 32 of the cell module 12, in order to provide measures for a possible case of fault of the battery cells 24. Lateral venting or ventilation openings can then be provided very freely on the cell module 12 or cell block, for example, or a free air chamber can be provided in the region of the side walls 32. In particular, measures of this kind allow gases or fluids leaking from at least one of the battery cells 24 in the case of a thermal event to be guided to corresponding openings of the battery housing 14, in particular to be guided in a targeted manner.

The two joining concepts are further preferably separated by the sealing tape 34 or a corresponding sealing lip and/or foam bead or the like, such that the structural connection can be effectively released again, which is accomplished by the further adhesive 30. The delimiting element, for example in the form of the sealing tape 34 shown in exemplary form in FIG. 1, additionally ensures that the heat-conducting adhesive or the adhesive compound 28 remains on the horizontal surface.

If it is required to clean the adhesive locations, then different measures can be taken. For example, the adhesive compound 28 can be easily manually removed from the underside of the cell module 12 or cell module housing 22 or from the top side of the base plate 16 using a simple plastic scraper. Residual quantities of the further adhesive 30 serving as a lateral fixing adhesive can be mechanically removed with a simple sharp tool. In the case of a repair, adhering residual quantities of adhesive additionally do not need to be completely removed. Instead, only a gap height to be provided for renewed insertion of the adhesive compound 28 or a gap width to be provided for renewed insertion of the further adhesive 30 need to be taken into account.

As an alternative to the products presently specified in exemplary form for providing the adhesive compound 28 and the further adhesive 30, products, for example from Polytec PT GmbH, can be used for the heat-conduction adhesive or the adhesive compound 28, for example a product of the type VP2108, which has a strength or shearing resistance of 0.5 MPa at a heat conductivity of approximately 2.5 W/mK. Further, thermally conductive adhesives can also be obtained from the company Polytec PT GmbH for providing the adhesive compound 28, for example an epoxy resin-based adhesive with boron nitride as a filler, which has the identification TC 433.

Products for providing the adhesive compound 28 can further be obtained from the company Copaltec, for example of the type ST 25 or ST 30. Such polyurethane potting compounds advantageously also have a low strength or shearing resistance in the region of 2 MPa in the case of a heat conductivity of approximately 1.5 W/mK.

For the further adhesive 30 used as a fixing adhesive, products from the company Rühl can in particular be used, for example a product of the type Purocast 765, which has a shearing resistance of 3 MPa to 10 MPa.

Furthermore, a product of the type PU 10 cast, for example from the company L&L Products, can be used for providing the further adhesive 30, said product having a shearing resistance of approximately 10 MPa.

LIST OF REFERENCE CHARACTERS 10 battery arrangement
12 cell module
14 battery housing
16 base plate
18 side wall
20 housing cover
22 cell module housing
24 battery cell
26 base
28 adhesive compound
30 housing cover
32 side wall
34 sealing tape
36 energy absorption element
38 outside
40 peripheral flange
42 output device
44 threaded spindle

The invention claimed is:

1. A battery arrangement for a motor vehicle, comprising:
a battery housing (14); and
a cell module (12) that is disposed on a base plate (16) of the battery housing (14), wherein the cell module (12) comprises a cell module housing (22) and a plurality of battery cells (24) disposed in the cell module housing (22) and wherein a base (26) of the cell module housing (22) is connected to the base plate (16) of the battery housing (14) by an adhesive compound (28);

wherein the cell module housing (22) is connected to a side wall (18) of the battery housing (14) by an adhesive (30) and wherein the adhesive (30) has a higher shearing resistance than the adhesive compound (28) disposed between a base (26) of the cell module housing (22) and the base plate (16) of the battery housing (14).

2. The battery arrangement according to claim 1, wherein the shearing resistance of the adhesive compound (28) lies in a range from approximately 0.1 MPa to approximately 2 MPa and/or the shearing resistance of the adhesive (30) lies in a range from approximately 5 MPa to 15 MPa.

3. The battery arrangement according to claim 1, wherein the adhesive compound (28) has a higher heat conductivity than the adhesive (30).

4. The battery arrangement according to claim 1, wherein the side wall (18) of the battery housing (14) is designed as one part with the base plate (16) of the battery housing (14).

5. The battery arrangement according to claim 1, wherein the adhesive compound (28) substantially areally covers the base (26) of the cell module housing (22) and wherein a surface of the base (26) of the cell module housing (22) covered by the adhesive compound (28) is larger by a multiple than a surface of a side wall (32) of the cell module housing (22) covered by the adhesive (30).

6. The battery arrangement according to claim 1, wherein edges of a surface occupied by the adhesive compound (28) on the base plate (16) of the battery housing (14) are delimited by a delimiting element and wherein the delimiting element is disposed between the base plate (16) of the battery housing (14) and the base (26) of the cell module housing (22).

7. The battery arrangement according to claim 6, wherein the delimiting element is a sealing cord and/or a sealing tape (34).

8. The battery arrangement according to claim 1, wherein the cell module housing (22) has an energy absorption element (36) that has an outside (38) facing the side wall (18) of the battery housing (14) and wherein the adhesive (30) is disposed between the outside (38) of the energy absorption element (36) and the side wall (18).

9. The battery arrangement according to claim 1, wherein a trough-shaped receiving part of the battery housing (14) is provided by the side wall (18) and the base plate (16) and wherein the battery housing (14) comprises a housing cover (20) that is connected to the receiving part.

* * * * *